M. W. BEEMER.
CHURN.
APPLICATION FILED JUNE 1, 1908.
922,076.
Patented May 18, 1909.
2 SHEETS—SHEET 1.
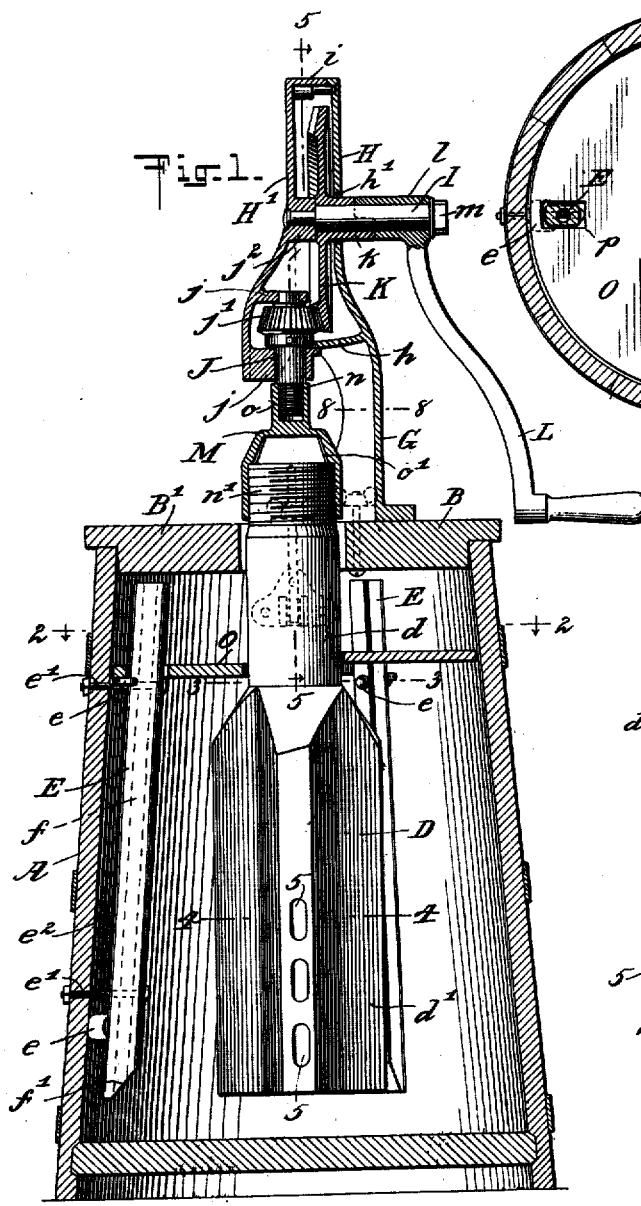
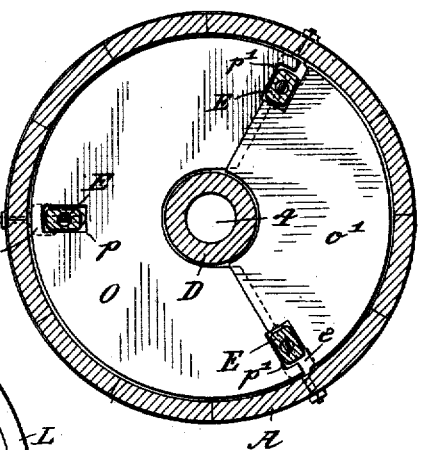
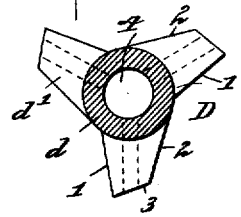
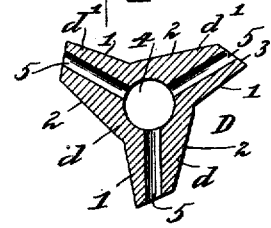
WITNESSES
INVENTOR
Miles W. Beemer
BY
ATTORNEYS

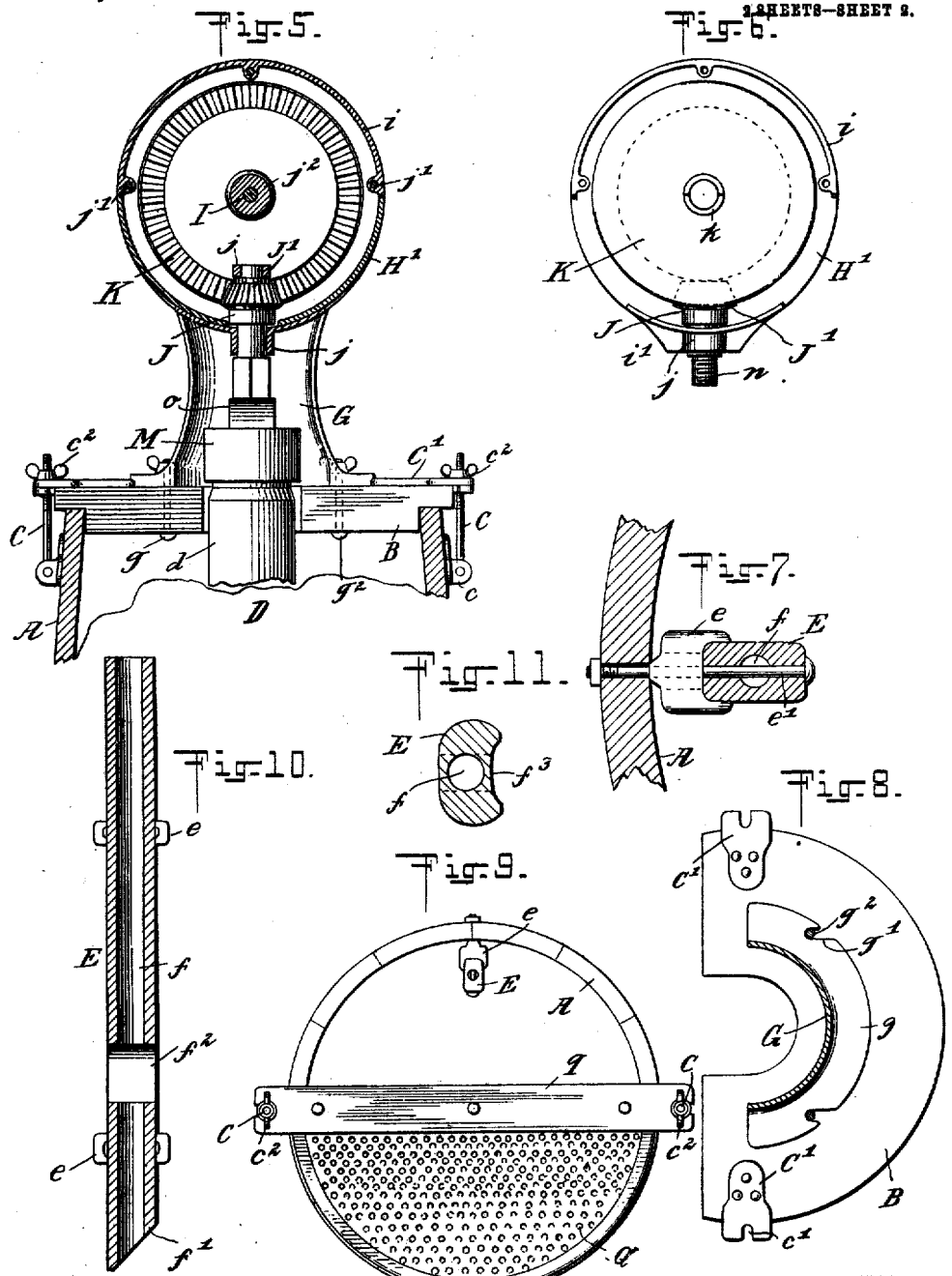

UNITED STATES PATENT OFFICE.

MILES W. BEEMER, OF NEW YORK, N. Y.

CHURN.

No. 922,076.　　　Specification of Letters Patent.　　　Patented May 18, 1909.

Application filed June 1, 1908. Serial No. 436,149.

*To all whom it may concern:*

Be it known that I, MILES W. BEEMER, a citizen of the United States, residing in the city of New York, borough of Manhattan, county and State of New York, have invented a certain new and useful Churn, of which the following is a specification.

This invention is a churn which embodies several features of novelty intended to secure, first, increased efficiency in the treatment of the cream by aerating it simultaneously with the churning operation; second, to reduce the labor and time required for churning the cream; third, to house or incase the gearing so that no injury can result to the operator's hands; fourth, to quickly disconnect the several devices when desired for washing them, as well as to easily assemble them for operation; fifth, to preclude splashing of the cream and enable a vessel of given size to be used to good advantage in treating different quantities of cream; sixth, to provide means whereby the butter milk may be poured out of the churn while retaining therein the floating particles of butter; and, finally, to simplify the construction, and secure economy in the manufacture of the churn.

In the accompanying drawings I have illustrated one practical embodiment of the invention, but the construction shown therein is to be understood as illustrative, only, and not as defining the limits of the invention.

Figure 1 is a vertical section through a churn embodying the invention, illustrating the dasher in elevation. Fig. 2 is a horizontal section on the line 2—2 of Fig. 1. Figs. 3 and 4 are detail cross sections through the dasher on the lines 3—3 and 4—4, respectively, of Fig. 1. Fig. 5 is a vertical section through the dasher-operating mechanism on the line 5—5 of Fig. 1. Fig. 6 is a detail view illustrating one part of the casing or housing for the gears of the operating mechanism. Fig. 7 is an enlarged detail view showing the churn vessel and one baffle in horizontal section, together with a spacer whereby the baffle is held away from the wall of the churn vessel. Fig. 8 is a detail cross section through the post or column on the line 8—8 of Fig. 1 illustrating means for securing said column to one part of the churn cover, and a part of the means for detachably securing said churn cover to the churn vessel. Fig. 9 is a plan view illustrating a strainer held detachably in position on the upper open part of the churn vessel. Fig. 10 is a detail vertical section through one form of baffle. Fig. 11 is a plan view of another form of the baffle.

A churn vessel, A, of any usual or ordinary construction, is provided with a cover consisting of sections, B, B', the latter being fitted loosely in position on the upper part of the vessel. Cover section, B, is adapted to be fastened fixedly in position by appropriate locking devices, shown in Fig. 5 in the form of bolts, C, each bolt being pivoted at its lower end to a plate, c, that is fixed to vessel, A. The upper end of each bolt is received in a notch, c', of a plate, C', secured to cover section, B, see Figs. 5 and 8, and on the upper threaded part of said bolt, C, is screwed a nut, $c^2$, adapted to bind on plate, C', whereby cover section, B, is clamped detachably and fixedly in position on vessel, A. Any suitable means may be employed, however, for securing cover section, B, in position.

D designates a dasher shown more particularly in Figs. 1, 3, and 4 of the drawings. In some respects said dasher is similar in construction to the dasher of my prior patent No. 780,260 granted January 17, 1905, but in the present invention the dasher is modified in construction with a view to securing important functions. Said dasher comprises a hollow stem or body, d, and a plurality of substantially radial wings, d', preferably three in number. The dasher is composed, preferably, of wood, although other materials may be substituted therefor, and said dasher is substantially hollow to secure the inflow of air through the dasher and into the body of the cream being operated upon, whereby the cream is aerated with a view to facilitating the churning of the butter and carrying off the odor and vapors, besides reducing the temperature of the cream by the aerating process. The shape of the wings, d', is shown more clearly in Figs. 3 and 4, by reference to which it will be seen that each wing is provided with three faces or sides 1, 2, 3. The sides 1, 2 converge outwardly, and said sides are unequal in area, the side 1 being considerably narrower and of less area than the side 2. The side 1 of one wing is next to the side 2 of an adjacent wing, the sides 1, 2 of adjoining wings being almost in opposing relation, but as shown in Figs. 3 and 4, the narrow side of one wing and the wide side of an adjoining wing form an acute angle. The face 3 of each wing is beveled backwardly from the path of rotation of the dasher, and lies at an angle to the faces 1, 2 of said wing. The hollow body or stem, $d$, of dasher, D, provides a longitudinal passage 4, and communicating with this passage are substantially radial passages 5 in wings, $d'$. As shown in Fig. 1, each wing may have a plurality of passages 5, each opening into longitudinal passage 4, but, if desired, I may use a single deep passage 5 in each radial wing in lieu of the plurality of passages 5 shown in Fig. 1. Dasher, D, is adapted to be rotated within churn vessel, A, at the required speed, and a rotary motion imparted to wings, $d'$, of said dasher causes them to act on the cream present in vessel, A, so as to induce the inflow of air through passages, 4, 5, simultaneously with the churning action of dasher, D, on the cream. This result is secured, mainly, by inclining the faces 3 of dasher wings backwardly from the path of rotation of said dasher, and the suction established by the whirling mass of cream induces the inflow of air.

An important feature in the construction of the new dasher consists of face 1 of the dasher wings at an obtuse angle to face 2 on adjacent wings, whereby the rotation of dasher toward the left in Figs. 1, 3, and 4 causes the faces 1 of each wing to throw the cream against long inclined faces 2 of dasher wings, thus setting up in the mass of cream the whirling motion which tends to secure maximum agitation or churning of the cream.

Positioned within churn vessel, A, is a plurality of baffles, E, preferably three in number, as shown in Fig. 2. Said baffles are placed in any desired order within the vessel, and they are spaced with relation to the wall thereof, the baffles being out of the path of wings, $d'$, of churn dasher. A peculiarity of baffles, E, consists in spacing them with relation to the wall of vessel, A, and this result is secured by the use of spacers, $e$, see Figs. 1, 2, and 7. Each spacer, $e$, is a single casting which is recessed or forked to embrace one edge of baffle, E, and this spacer is positioned between baffle, E, and vessel, A, so as to leave an intermediate space indicated at $e^2$ for the circulation of cream. A bolt, $e'$, passes through baffle, E, and spacer, $e$, for the purpose of securing said spacer firmly in position against vessel, A, and, also, of securing baffle, E, in position against the spacer. Two or more spacers may be used in connection with each baffle, as shown in Fig. 1. If desired separate bolts, such as $e^3$ in Fig. 1, may be used for fastening baffle, E, directly to vessel, A. In the preferred form of baffle, it is provided with a longitudinal air passage, $f$, and with an inclined lower end, $f'$, said baffle being supported, preferably, within vessel, A, so that its lower beveled end, $f'$, is free from contact with the bottom of said vessel. If desired, baffle, E, may be provided with a transverse opening, $f^2$, see Fig. 10, which opening communicates with longitudinal passage, $f$, but said transverse opening, $f^2$, may be omitted if desired. From this description, it will be seen that each baffle is practically hollow, and its lower beveled end is adapted to be immersed in the cream, whereby the whirling motion imparted to the cream by the action of dasher, D, will induce the flow of air through the hollow passage.

It will be noted that when dasher, D, is rotated its wings, $d'$, act to impart to the cream a whirling action and throw it against baffles, E, but by spacing the baffles inwardly with relation to vessel, A, some of the cream is free to pass through the spaces, $e^2$, whereas other portions of the cream will be broken up by throwing them against the baffles. The rotary motion of the cream in sweeping past the beveled ends, $f'$, of the baffles induces the inflow of air, and at the same time, the cream acts to secure a like inflow of air through the passages in the body and wings of the baffle, whereby cream is thoroughly aerated.

I will now proceed to describe the dasher-operating mechanism shown more particularly in Figs. 1, 2, 5, and 6 of the drawings. On cover section, B, is mounted a post or column, G, the same being preferably cast with a curved body portion and with a base flange, $g$, the latter having openings or notches, $g'$, through which are passed the fastening bolts, $g^2$, see full line illustration in Fig. 8, and dotted lines in Figs. 1 and 5. The upper part of column, G, is formed with a substantially circular plate, H, which forms one member of a gear casing, the other member of said gear casing, H', being substantially circular so as to correspond to said member, H. The member, H, is preferably integral with column, G, and at its lower portion said member, H, is provided with an inwardly extending curved flange, $h$. The complemental member, H', of said gear casing is provided with a flange, $i$, at its upper part and another flange, $i'$, at its lower part, and this flange, $i'$, is enlarged to form a bearing, $j$. The flanged member, H', is assembled in matching relation to member, H, of column, G, and said members are secured rigidly together by suitable bolts or screws indicated at $j'$ in Fig. 5, whereby the two parts of the gear casing are separably attached. Member, H, is provided, also, with an opening, $h'$, and member, H', is shown as having a boss, $j^3$, to which is attached one end portion of an arbor or spindle, I.

A vertical dasher-operating shaft, J, is journaled in bearings, $j$, of member, H', and at its upper part said shaft, J, is provided with a beveled gear, J', the latter being positioned above bearing, j. Said beveled gear meshes with a driving beveled gear, K, which is provided with a sleeve, k, fitted loosely on spindle, I, and this sleeve, k, is notched or cut away so as to have interlocking engagement with a sleeve, l, of an operating crank, L. Said crank sleeve, l, is coupled or clutched to sleeve, k, of gear wheel, K, by interlocking the notched ends of sleeves, k, l, and thus the crank, L, is mounted on spindle, I, so as to turn freely thereon, whereby gear, K, is operated directly by crank, L. A collar or nut, m, is pinned to arbor, I, or otherwise made fast therewith, to preclude sleeve, l, from endwise movement on arbor, I.

It will be observed that gears, J', K, are housed or incased within the gear casing formed by complemental members, H, H', and access cannot be obtained to the gears without removing member, H', thus obviating the danger of injury to an operator's hands by the gears. Should it be desired to obtain access to the gears for lubricating or other purpose, collar, m, is removed from arbor, I, crank, L, is detached and the screws, j', removed, after which member, H', may be disconnected, at which time the shaft, J, gears, J', K, and arbor, I, are adapted to be withdrawn from member, H, and column, G. When the part, H', is disconnected, the shafts and gears remain attached thereto, as shown in Fig. 6, but to replace the parts, it is only necessary to insert spindle, I, through opening, h', of member, H, and replace screws, j', so as to rigidly connect member, H', to member, H, whereby the entire operating mechanism is supported on column, G.

The dasher, D, and operating shaft, J, are united detachably by a coupling, M, the same being preferably cast in a single piece of metal. The lower part of dasher shaft, J, is provided with a male thread, n, whereas the upper part of the tubular body, d, of dasher, D, is provided with a male threaded portion, n'. Coupling, M, is provided in its upper part with a female threaded socket, o, and in its lower part with a similar female threaded socket, o', said sockets being of different diameters so as to receive the shaft, J, and upper part of dasher, D. By reference to Fig. 1, it will be noted that threaded part, n, of shaft, J, is screwed into socket, o, of coupling, M, thus uniting said coupling to dasher shaft for rotation therewith. The upper threaded end, n', of dasher, D, is screwed into threaded socket, o', of coupling, M, whereby said dasher is attached to the coupling so that it will rotate with coupling, M, and shaft, J. The dasher is suspended from the coupling. When it is desired to remove the dasher, it is only necessary to hold it firmly in one hand and operate the crank with the other hand, whereby the coupling is rotated so as to unscrew dasher from said coupling, but to attach the dasher to the coupling crank, L, should be rotated in an opposite direction, dasher, D, being held from rotating by hand, whereby the dasher may be easily attached to, or disconnected from, the coupling.

The churn vessel is adapted to contain a certain quantity of cream, say 10 quarts, but when churning a smaller quantity, say 6 quarts, it is found that the cream has a tendency to splash within the vessel and adhere to the wall of said vessel and to the baffles. With a view to overcoming the splashing of the cream and enabling the apparatus to be used for churning a smaller quantity of cream, I employ a partition adapted to be fitted removably within the vessel. Said partition is shown in Figs. 1 and 2 as consisting of sections, O, O'. Section, O, is slotted at p to fit over one baffle, E, and is notched at p' to partly fit around other baffles, E, the notched and slotted portions of sections, O, being adapted to rest on spacers, e, whereby the part, O, of the partition is supported within the churn vessel. The section, O', is notched to fit partly around two of the baffles and to rest upon section, O. The partition thus forms a false cover within the churn vessel, which cover is supported by the baffles. The partition precludes the cream from splashing upwardly against the cover, the section, O', is easily removable when it is desired to inspect the cream, and the entire partition can be readily withdrawn for cleaning and other purposes. Said partition may be made of wood, metal, or other material.

When the butter is churned it is desirable to pour off the remaining milk, but ordinarily a certain quantity of floating butter particles are lost. I have provided a strainer, Q, which is adapted to be held in position on the upper end of the vessel, A, for the purpose of retaining the butter particles when pouring off the buttermilk. After the cover, B, B', the operating means and the partition are disconnected from the churn, strainer, Q, is placed on the upper edge of said vessel. This strainer is provided with a plate or bar, q, having notches in its ends for the reception of the bolts, C, and when the nuts, $c^2$, are screwed into position, the strainer, Q, is clamped firmly upon vessel, A. Said vessel may now be turned over to pour off the butter-milk through the strainer, Q, the latter acting to retain the butter particles.

In Fig. 11 of the drawings I have shown a baffle which is provided in one side with a longitudinal duct or channel, $f^3$. In the operation of the churn, the cream is churned against one side of the baffle, that is against the side opposite to that in which the duct or channel is formed. As the cream sweeps around the baffle it flows across the duct or channel, thereby producing an eddy-current in the cream and inducing a flow of air along the baffle and within the duct.

Having thus fully described the invention, what I claim as new, and desire to secure by Letters Patent is:

1. In a churn, a dasher comprising a plurality of wings, each having a face inclined backwardly from the circular path described by the wing, and a passage opening through said face for the outflow of air which is induced to flow through the dasher by the suction of a whirling mass of cream, each wing being provided with side faces which converge outwardly, said side faces being unequal in width, a narrow face of one wing immediately adjoining a wide face of the next wing, said adjoining wide and narrow faces being at an obtuse angle to each other.

2. In a churn, a dasher provided with a plurality of substantially radial wings each having three exposed faces or sides, two of said sides converging outwardly and being of unequal width, the narrow side of one wing being next, and at an angle, to the wide side of an adjoining wing.

3. In a churn, a dasher comprising a stem, and a plurality of substantially radial wings, each wing having three flat faces or sides, two of which are uneqal in width, and the narrow side of one wing being at an obtuse angle to the wide side of the adjacent wing, an air passage extending through the stem, and other air passages extending through the wings, the last mentioned passages opening through the respective sides at the outer portions of the wings.

4. In a churn, a dasher shaft, means for rotating the same, a dasher, and a multiple-socket coupling having threaded engagement with the dasher shaft and the dasher, whereby the dasher may be coupled or uncoupled by rotating the dasher shaft.

5. In a churn, a dasher shaft provided with a thread, a dasher having a thread, and a coupling member having a plurality of separate threads adapted to engage the threads on the dasher and dasher shaft, respectively.

6. In a churn, a dasher shaft provided with a thread, a dasher having a thread, and a coupling provided with two individually threaded sockets into which are adapted to be screwed the dasher shaft and the dasher, respectively.

7. In a churn, a dasher shaft provided with a thread, a dasher having an internal air passage and an external thread, and a coupling provided with two threaded sockets and with air openings, the threaded parts of the dasher and the dasher shaft being screwed into the respective sockets of the coupling.

8. In a churn, a threaded dasher shaft, a coupling provided with separate threaded sockets and with an air inlet intermediate said sockets, said dasher staff being screwed into one socket of said coupling, and a hollow threaded dasher screwed into the other threaded socket of the coupling, whereby air may pass freely through the inlet of the coupling into said dasher.

9. In a churn, a post or column, a casing or housing comprising a plurality of flanged sections, one of which is rigid with said post or column, said sections being separably fitted together and producing a substantially closed chamber, separate shaft bearings in the housing, a dasher staff journaled in one bearing of the housing, an operating shaft mounted in the other bearing, and gears secured to the operating shaft and the dasher shaft respectively, said dasher shaft and the operating shaft being removable with one section of said housing and retained in a connected condition by the gears.

10. In a churn, a post or column provided with a member forming one part of an inclosure or casing, another member separably attached to the first named member and coöperating therewith in producing an inclosure or casing, an operating shaft mounted in one member, a dasher shaft mounted in the same member which supports the operating shaft, and gears fixed to said shafts.

11. In a churn, a vessel, a dasher therein, and baffles each provided in its rear face with an air duct or channel.

12. In a churn, a post or column, a separable gear casing comprising flanged separable members, one of said members being rigid with the post or column, and the other member having a plurality of shaft bearings, an operating shaft mounted in one bearing of the detachable casing member, a dasher shaft journaled in another bearing of said detachable casing member, and meshing gears each fixed to one of said shafts, said gears being positioned intermediate the separable members of the casing.

13. In a churn, a gear casing comprising members one of which is provided with bearings, means for securing said members detachably together, dasher and operating shafts journaled in bearings of one of said members, and gears each secured to one of said shafts.

14. In a churn, a vessel, a rotary dasher therein, and a plurality of baffles each fixed within, and spaced relative to, the wall of said vessel, each baffle being provided with a longitudinal groove in that face thereof which opposes the wall of said vessel, whereby cream is adapted to sweep across the rear face of the baffle for inducing the inflow of air through said groove of the baffle.

15. In a churn, a vessel, a rotary dasher therein, and a plurality of baffles each fixed within, and spaced relative to, the wall of said vessel, each baffle being provided with a longitudinal air passage interiorly thereof and provided, also, with a longitudinal groove in that face thereof which opposes the wall of said vessel, whereby cream is adapted to sweep across the lower open end of the baffle and across the rear face of the baffle for inducing the inflow of air through the interior air passage and said groove of the baffle.

16. In a churn, a vessel, a rotary dasher adapted to operate therein, and a plurality of baffles within said vessel, each baffle having an inclined lower end and a longitudinal air passage which opens through said lower end.

17. In a churn, a vessel, a rotary dasher adapted to operate therein, and a plurality of baffles within said vessel, each baffle having a longitudinal air passage and an air outlet in communication with said passage.

18. In a churn, a vessel, a dasher therein, a plurality of baffles therein, and a splash-preventing member positioned within said vessel above the liquid level therein and the operating part of said dasher.

19. In a churn, a vessel, baffles fixed therein, and a splash-preventing partition composed of separable sections supported by said baffles within said vessel and above the liquid level therein.

20. In a churn, a vessel, a plurality of baffles therein, spacers fixed to the vessel and retaining said baffles in fixed positions therein, and a sectional splash preventing partition resting on the spacers and supported within the vessel above the liquid level therein.

21. A churn vessel, open at its upper end, a strainer adapted to be positioned across said open end of the vessel, and means for detachably clamping the strainer in fixed position upon the vessel.

22. A churn vessel having an open upper end, a strainer provided with a fastening plate adapted to rest upon said vessel, and bolts attached to the vessel and the plate whereby the strainer may be secured detachably in position upon the churn vessel.

In testimony whereof I have signed my name to this specification in the presence of two subscribing witnesses.

MILES W. BEEMER.

Witnesses:
JAS. H. GRIFFIN,
H. T. BERNHARD.